US008543647B2

(12) United States Patent
Cheng et al.

(10) Patent No.: US 8,543,647 B2
(45) Date of Patent: Sep. 24, 2013

(54) AUTOMATED CUSTOMER INCIDENT REPORT MANAGEMENT IN A SOCIAL NETWORKING SYSTEM

(75) Inventors: Loren Alfred Cheng, Mountain View, CA (US); Pratap Venkataram Prabhu, Sunnyvale, CA (US); Jesse Michael Munitz-Alessio, San Francisco, CA (US); Vladimir Gregory Korshin, San Francisco, CA (US); Shoeb Altaf Omar, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 93 days.

(21) Appl. No.: 13/397,638

(22) Filed: Feb. 15, 2012

(65) Prior Publication Data

US 2013/0212175 A1 Aug. 15, 2013

(51) Int. Cl.
*G06F 15/16* (2006.01)
*G06F 15/173* (2006.01)

(52) U.S. Cl.
USPC ............... 709/204; 709/223; 709/224

(58) Field of Classification Search
USPC ............... 709/203, 204, 224, 231; 717/101, 717/127
See application file for complete search history.

(56) References Cited

U.S. PATENT DOCUMENTS

| 7,024,450 | B1* | 4/2006 | Deo et al. ............... 709/203 |
| 8,255,513 | B2* | 8/2012 | Assa ............... 709/224 |
| 2006/0173957 | A1* | 8/2006 | Robinson et al. ............ 709/204 |
| 2007/0011659 | A1* | 1/2007 | Venolia ............... 717/127 |
| 2010/0211924 | A1* | 8/2010 | Begel et al. ............... 717/101 |
| 2010/0223392 | A1* | 9/2010 | Pond et al. ............... 709/231 |

* cited by examiner

*Primary Examiner* — Quang N Nguyen
(74) *Attorney, Agent, or Firm* — Fenwick & West LLP (57) ABSTRACT

A social networking system is configured to generate node graphs to handle specific types of customer incident reports. The node graphs comprise data structures that include nodes connected in acyclic graphs. Each node includes a node handler and optionally a user interface widget. Activating a node graph causes a subset of the nodes in the node graph to execute their node handlers. The executing node handlers generate a customer incident resolution that may include information gathering, manual review, and communications to users and third-party systems. Generation of the customer incident resolution through the node graphs allows the social networking system to handle customer incidents consistently, efficiently, and in a scalable manner.

15 Claims, 3 Drawing Sheets

AUTOMATED CUSTOMER INCIDENT REPORT MANAGEMENT IN A SOCIAL NETWORKING SYSTEM

BACKGROUND

This invention relates generally to automated customer management, and in particular to the automated management of customer incident reports in a social network system.

Social networking systems allow users to create accounts that are tied to their identities, and to interact with their friends, acquaintances, family members, and co-workers through a common platform. A social networking system may also allow businesses to offer goods and services, both real and virtual, to users of the social networking system. In addition, a social networking system may enable users to market their own goods and services directly, or indirectly, to other members of the social networking system.

Interactions between users, or between users and businesses, may result in customer incident reports that require the involvement of the social networking system. Customer incident reports are generated when customers require interaction with an automated system or human agent, e.g. in order to report a faulty transaction, dispute a charge, lodge a complaint, request a remedial action, make inquiries, etc. However, the process for using social networking system information to resolve customer incident reports is currently resource intensive. Although human agents can be used to sift through the social data to determine information that is relevant to a customer incident report, such a use of human agents is expensive since the volume of customer incident reports can grow very large as a social network's user base increases into millions and hundreds of millions.

What is required is an automated system that can utilize social data to help resolve customer incident reports. However, the types of customer incident reports that can be generated as a result of transactions between users, or between users and businesses, can be very large. For example, customer incident reports may be generated due to fraud, faulty products, misplaced orders, mistyped shipping information, harassment, spam, and more. As a result, using engineering resources to program a separate automated solution for each customer incident report type can itself be resource intensive.

SUMMARY

A social networking system establishes a widget store, a handler store, and a node store. The widget store comprises one or more user interface widgets, where each user interface widget comprises a user interface definition. The handler store comprises one or more node handlers, where each node handler comprises computer executable instructions. The node store comprises one or more nodes, where each node comprises a node handler, and at least one of the nodes further comprises a user interface widget.

The social networking system provides an administrative user with an interface to generate a node graph. The node graph comprises a plurality of nodes connected in an acyclic graph and is configured to generate a customer incident resolution when activated. The social networking system then receives, from a user device, a customer incident report, comprising customer incident data. Responsive to receiving the customer incident report, the node graph is activated and a customer incident resolution is generated using the activated node graph.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
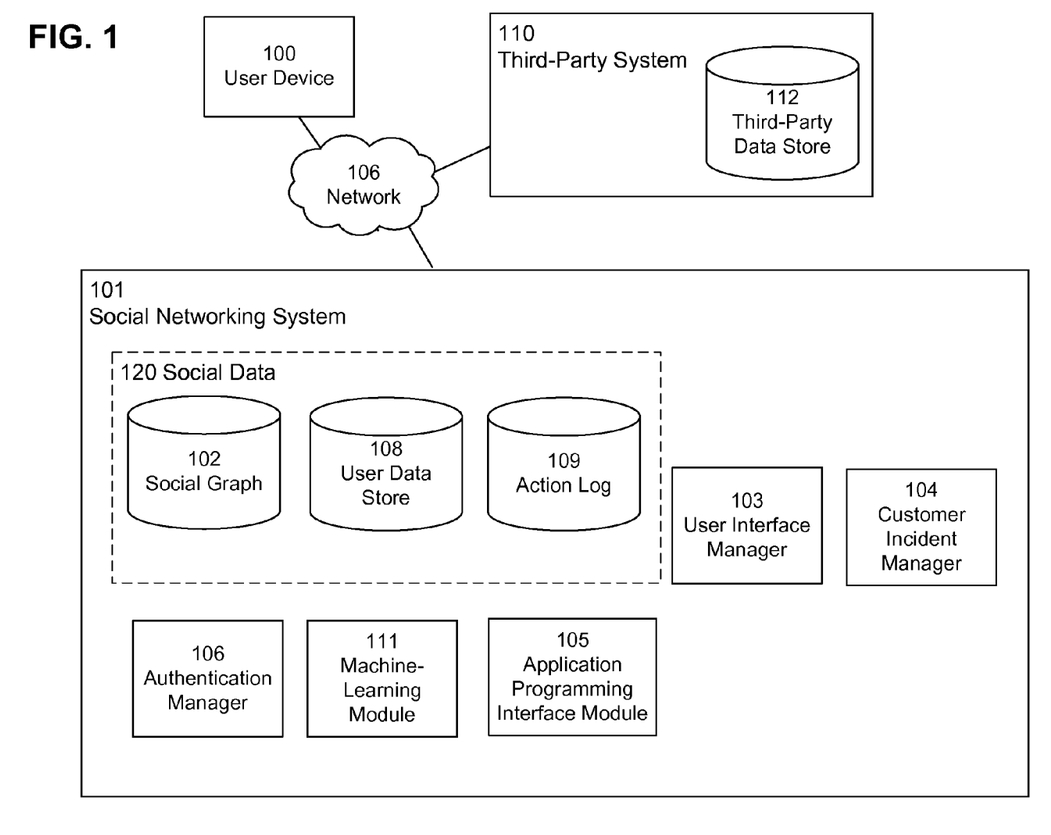
FIG. 1 illustrates a social networking system environment in which one embodiment of the automated customer incident report management system is implemented.

Overview of the Social Networking System Environment for Automated Customer Incident Report Management FIG. 1 is a high-level block diagram of the social networking system environment in which the automated customer incident report management process operates, according to one embodiment. FIG. 1 shows a social networking system 101 communicating with a user device 100 and a third-party system 110, over a network 106. Although one user device 100, one social networking system 101, and one third-party system 110 are illustrated in this figure, in practice there may be many user devices 100, third-party systems 110, and social networking systems 101 connected over the network 106.

The network 106 is the Internet or another system of interconnected computer networks that use standard communications technologies and/or protocols to facilitate data transmission. Thus, the network 106 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 106 can be represented using technologies and/or formats including the hypertext markup language (HTML) and the extensible markup language (XML). In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

A user interacts with the social networking system 101 using a user device 100, such as a personal computer or a mobile phone. The user may interact with the social networking system 101 via a web application running in a web browser executing on the user device 100; or the user may interact with the social networking system 101 through a native application running on the user device 100. These applications may be downloaded to the user device 100 from the social networking system 101, or they may be provided by a third party. Typical interactions between the user device 100 and the social networking system 101 include operations such as creating an account, viewing profiles associated with other accounts, contributing and interacting with media items, joining groups, listing and confirming attendance at events, checking in at locations, liking certain pages, creating pages, and performing other tasks that facilitate social interaction. Users may also purchase goods and services, both virtual and real, through the social networking system 101. Users purchasing goods and services through the social networking system 101 may be connected to a third-party system 110 in order to complete a transaction. The third-party system 110 may report the details of a transaction back to the social networking system 101, and the social networking system 101 may store this information in the action log 109.

A user connected through a user device 100 may also generate a customer incident report through their interaction with the social networking system 101. When a customer incident report is generated in the social networking system 101, a customer incident report resolution process is initiated. The customer incident report resolution process is managed by the customer incident manager 104. Customer incident reports come in a variety of types and in order to handle these incidents reports, each type may require a different set of user interfaces, data, and customer interactions. The user interfaces, data, and customer interactions used to handle a customer incident report are called the customer incident resolution for that report.

The customer incident manager 104 provides resources and methods that allow administrators of the social networking system 101 to quickly configure custom automated systems that can generate customer incident resolutions for new types of customer incident reports. The automated systems may generate a variety of customer incident resolutions to handle customer incident reports. Generated customer incident resolutions may include social networking system actions such as banning an account, deleting content posted by a user, issuing a refund, issuing courtesy credits, etc. Customer incident resolutions may also include sending messages to a third-party system 110 so that the third-party can take corrective action, for example, correcting an order, providing credit card information for a refund, issuing a refund directly, issuing a courtesy credit, etc. Through messages the third-party systems can be directed to take any action that is appropriate to resolve a customer incident report. In addition, the generated customer incident resolutions will also often send a communication to a user device in order to obtain information from a social networking user, or to provide the user with information. The customer incident manager 104 and the resolution generation process are described in more detail herein.

The third-party system 110 can be any computer system operated by a third-party that communicates with either the user device 100 or social networking system 101 over the network 106. Examples of third-party systems 110 include web servers, database servers, credit card processing servers, etc. These systems may provide information to the social networking system 101 to help resolve customer incident reports, and they may request information from the social networking system 101 in order to complete some process of their own. For example, in the case where a third-party system 110 is contemplating giving a user a refund for some purchase made in the past, the third-party system 110 may provide transactional details about the purchase to the social networking system 101, and then may receive confirmation from the social networking system 101 that the refund is warranted because the user has a good record and the purchase appears to be the result of a mistake.

The social networking system 101 allows users to create accounts and establish links with other users of the social networking system 101. When two users become linked, they are said to be "connections," "friends," "contacts," or "associates" within the context of the social networking system 101. The social networking system 101 includes a social graph 102. The social graph 102 stores the connections that each user has with other users of the social networking system 101. The social networking system 101 may also enable businesses to establish accounts and form links with users of the social networking system 101. These links may be formed explicitly by either a user or the business, or they may be formed implicitly as a result of a customer purchase, review, or some other interaction between the user and the business.

The social networking system 101 provides a user with various ways to interact with and communicate with businesses and other users, for example, by email (internal and external to the social networking system), instant message, text message, phone, through social network apps and the like. The social networking system 101 may send data related to an interaction or communication of a user to a third-party system 110. Similarly, a third-party system 110 may send data to the social networking system 101 that is related to an interaction or communication conducted external to the social networking system 101.

The social networking system 101 maintains a user account for each user that has joined the social networking system. Businesses may also have their own accounts. The user or business that has created an account on the social networking system is referred to as the "account-holder" for that account. The social networking system 101 also maintains a profile with each account. The profile describes the account-holder's characteristics. For a user the profile contains information such as work experience, educational history, hobbies, location, or similar data, and may also include data describing one or more relationships between the user and other users. In the case of a business, the profile may contain information such as a URL for the business's website, a description of the business, photos of products, etc.

The social networking system 101 includes a user interface manager 103 that allows a social networking system user to interact with the social networking system 101 through a social networking system interface. For example, the user interface manager 103 may generate one or more web pages that are displayed on the user device 100, where the web pages display social networking system data such as images, video, user profiles, etc. The user interface manager 103 also generates the interfaces necessary for the social networking system 101 to request and receive information from the user operating the user device 100. For example, the user interface manager 103 may create a web page form so that a user can provide biographic information, such as the user's age, for use by the social networking system 101 in creating that user's user profile. If a user is interacting with the social networking system 101 through an application running on the user device 100 (such as a mobile phone app, tablet app, or desktop application) the user interface manager 103 may simply send user interface configuration information to the user device 100, where the user interface configuration information is used by the application to determine the user interface to show to a social networking system user. User interactions with the user interface running on the user device 100 may be sent back to the social networking system 100.

Any action that a particular account-holder communicates to the social networking system 101 is associated with the account holder's account, through information maintained in an action log 109. Such actions may include, for example, adding a link to a user, sending a message to a user, making a purchase, sending a complaint, reviewing a business etc. A log entry for an action may include the time of occurrence of the action, a type of action performed, the account-holder who performed the action, an object on which the action was performed, and any other information related to the action, such as the location associated with the action, price paid for an item, etc. For example, in the action 'Adrian bought a ring at Tiffany & Co.,' the type of action is buying, the object is a ring and extra information includes where the ring was bought, Tiffany & Co. The actions may be taken online either within the social networking system 101 or outside of it, or they may be actions performed in the real world and recorded and communicated to the social networking system 101 by a user, by a third-party system 110, or by some other means.

User information is stored by the social networking system in the user data store 108. User information includes not only the biographic information provided by users, but also may include content uploaded by a user such as photographs, video, status updates, blog posts etc. When other users request the user's profile page, user interface manager 103 may retrieve the user's data from the data store 108 and generate a user profile web page for display on the user device 100. The user data store 108 may also contain personal information about the user such as credit card information, bank information, social security number, address, credit score, etc. The social networking system 101 may request the user's permission before storing such personal information in the user data store 108. The user data 108, the social graph 102, and the action log 109 are collectively called the social data 120.

When a user of the social networking system performs a transaction with a third-party system 110, such as a retail website operated by a business, the user may request that the social networking system 101 transfer some of her financial information (for example, credit card information) to the third-party system 110 to complete a transaction. The user and the business may also process payments directly through the social networking system 101, in which case the financial information is not directly transferred from the social networking system to the third-party system, and instead the social networking system 101 credits an account for the business directly. User data concerning a particular transaction between a user and the third-party system 110 may be stored in the third-party data store 112. For example, the third-party data store 112 may store information concerning a product bought by the user, the price paid, the date of purchase, and the address where the product was shipped. Although only one third-party system 110 and one third-party data store 112 are shown in FIG. 1, in practice there may be many third-party systems 110 and third-party data stores 112. Data related to a single user transaction may be scattered across many third-party systems 110 and third-party data stores 112. For example, credit card details for a user may be stored by a credit card processor that is different than the Internet retailer that sells a product to the user. Some or all of the information held by third-party systems 110 may be communicated back to the social networking system 101.

The authentication manager 106 authenticates a user on user device 100 as having an account on the social networking system 101. The authentication manager 106 allows a user to log into the social networking system 101 through any user device 100 that has an application supporting the social networking system 101. In some embodiments, the authentication manager 106 validates users that connect to the social networking system 101 through third party applications. The authentication manager 106 may also authenticate a user on behalf of a third-party system 110, so that the user and the third-party system 110 may conduct a transaction securely.

The machine-learning module 111 trains machine-learned models that may be used by the customer incident manager 104 or other modules of the social networking system 101. Machine-learned models may be used in discovering the relationship between social data in the social networking system 101 and particular incident types. Such information may be used beneficially by the automated incident handlers. In addition, machine-learned models may be used to identify trends in customer incident reporting. Identifying such trends may help to control the root causes of such customer incident reports. The application of machine-learned models for customer incident report management is discussed in more detail herein.

The application programming interface module 105 provides programmatic access to the social networking system 101, including both the social data 120 and the customer incident manager 104. The application programming interface module 105 allows any data or function that can be accessed or performed by a user to be also accessible or performable via a computer program running on a user device 100, third-party system 110, or on the social networking system 101.

Customer Incident Manager

Figure 2:
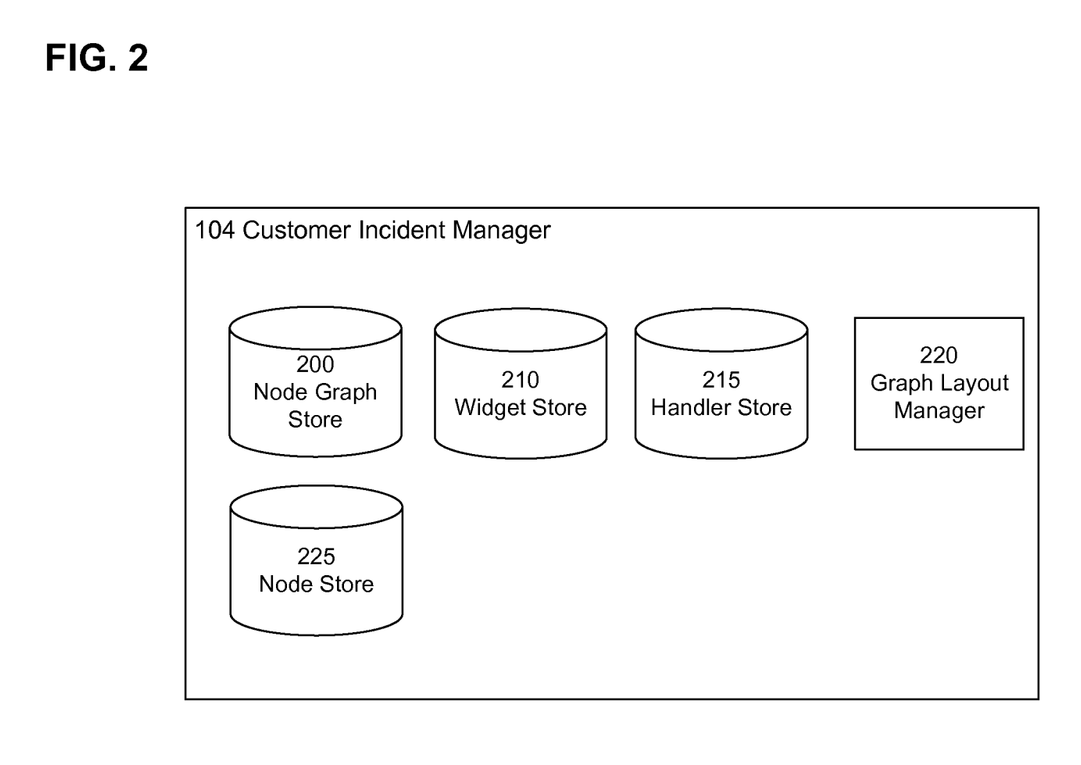
FIG. 2 illustrates the components of the customer incident manager according to one example embodiment.

FIG. 2 illustrates one embodiment of the customer incident manager 104. The customer incident manager 104 includes a node graph store 200, a widget store 210, a handler store 215, a node store 225, and a graph layout manager 220.

The customer incident manager 104 presents administrative users of the social networking system 101 with an interface that allows them to configure node graphs that may be activated to automatically generate customer incident resolutions. Administrative users are users of the social networking system that have administrative responsibilities, such as responding to customer complaints, maintaining the social networking system software and hardware, etc. Typically administrative users are employees of the operators of the social networking system 101. The functionality that the customer incident manager 104 provides the administrative users will usually not be provided to other users of the social networking system 101.

Generation of customer incident resolutions by node graphs may comprise multiple steps, and while some node graphs implement fully automated processes, other node graphs may use a combination of manual review and automated information gathering. Node graph processes may include, for example, steps where social networking system users are queried for information, steps where third-party systems are queried for data, steps where information is sent for display to social networking system users, steps where human agents are used to evaluate gathered data, etc. In one example embodiment, a node graph that is configured to handle customer incident reports related to harassment may, when activated, initiate a process that includes a step where social data related to the alleged victim and perpetrator is gathered, a step where the alleged harassing content is evaluated by a machine-learned model, and finally a step where the gathered information and output of the model are provided to a human agent for manual evaluation. By using node graphs the social networking system can generate customer incident resolutions in a way that is consistent across users, efficient, and scalable.

A node graph is a data structure that defines a set of data inputs, user interfaces, and processes that may be used to resolve a customer incident report or to assist a human agent in resolving a customer incident report more efficiently. There are different node graphs that are configured to deal with different types of customer incident reports. For example, one node graph may be created to resolve credit card charge disputes from social networking users, while another node graph may be created to resolve reports of harassment over the social networking system. Each node graph consists of a set of nodes arranged in an acyclic graph structure. Each node in the graph has an associated handler and may also include one or more user interface widgets (UI widget). Each node may also contain a list of one or more child-nodes. Some nodes are terminal nodes in that they have no child-nodes. Once the handler of a terminal node completes execution, the node graph process is considered completed.

The connectivity information that determines how the nodes are arranged in relation to each other in the graph may be implicitly contained in the child-node information of each node, or it may be stored explicitly in the node graph itself. The information may also be stored as a combination of per-node information as well as information stored in the node graph. For example, the layout of the node graph may be represented by designating a "top node" or "root node" explicitly, while the remaining connectivity information is stored implicitly in the child-node lists for the root node and subsequent nodes in the graph.

The node handlers are computer executable instructions (scripts or computer programs) that take input and generate outputs and/or actions. The output of one node's handler can be used as one input for the next node's handler. The actions taken by node handlers include, for example, sending messages to social networking system users, generating alerts for administrative users, blocking users, deleting user content, generating refunds, activating other nodes, activating other node graphs, etc. Almost any action that can be activated through computer code in the social networking system 101 can be activated by a node handler, including functionality accessed through the application programming interface module 105. A node handler may even queue a certain set of information concerning a customer incident report for manual review by a human administrator. For example, a node handler that is processing a customer incident report related to fraud may gather all the information related to that report into a structured form and place the structured information into a review queue so that a human can review it more efficiently.

The outputs of node handlers can include information such as a designation that a particular transaction is fraudulent, a probability that a particular piece of content is spam, a list of a certain user's purchases in the last 24 hours, etc. These outputs may be used as inputs by other nodes, or they may be the desired end result themselves. The node handlers are stored in the handler store 215. The node handlers can utilize PYTHON, PHP, JAVASCRIPT, JAVA, C, C++, ERLANG, or any other technology adapted to creating scripts or programs. The output and actions generated by the node handlers are considered part of the customer incident resolution that is generated by the node graph.

The UI widgets contain user interface definitions that can be used to generate user interface configurations. These user interface configurations can be sent to user devices to generate user interfaces for presentation to target users. For example, one UI widget may consist of a definition that causes a text box with the words "Please indicate your state of residence" to be displayed on a user's device, along with a drop-down menu that allows selection of a US state. These UI widgets can be used by node handlers to solicit input from target users or to communicate information to these users. The UI widgets are stored in the widget store 210. UI widgets may consist of a combination of HTML, CSS, FLASH, JAVASCRIPT, or any other technology that can be used to specify a user interface presentation on a client device. In some embodiments UI widgets contain user interface definitions in XML or some other proprietary format, which are translated to other formats like HTML, CSS, FLASH, etc., before being sent to a user device 100.

Activating a node of the node graph causes it to execute its handler. The handler when executed may request data inputs based on its requirements. Some of the data inputs that a node handler requests may be provided by other nodes that were activated previously (parent nodes), and other data may be provided from other sources such as the social data 120 and non-social data from the social networking system 101, and the third-party data from the third-party data store 112 of the third-party system 110. The social data 120, non-social data, and third-party data provided to a node are collectively called the operational data for that node.

Operational data often includes information about the target users in a customer incident report. The target users are the social networking users that are identified in the customer incident report, as well as those users that are connected in the social graph to the identified users. For example, if a user reports that another user is harassing them, then a customer incident report may be generated to resolve this harassment. For this customer incident report the first user is a target user (called the reporting user) and the second user is also a target user (called the reported user). In addition, friends of either the reporting user or the reported user may also be target users for a node. Data for these friends (such as age, harassments reported by, harassments accused of, measure of "badness" etc.) may be included in the operational data for the node in addition to data about the reporting user and reported user.

In some cases a node handler may request additional information from a target user that is not included in the operational data (e.g., information that is unknown to the social networking system 101 and the third-party systems 110). In order to obtain information from a target user the node handler may show a user interface to the target user on their user device 100, where the user interface is configured to query for the desired information and capture the target user's response. The properties of this user interface (e.g. the layout, text displayed, etc.) are determined by a UI widget associated with the node. UI widgets may also be used by node handlers to display information to a target user in order to give them information, change their behavior, etc. For example, a node graph that is designed to resolve customer incident reports about bullying may have a node that when activated executes a handler that uses a UI widget to cause a dialog box to appear on the alleged bully's device. The dialog box may contain text that informs the alleged bully about the social networking system's code of conduct, and may request the alleged bully to refrain from abusive conduct. The dialog box may further ask the alleged bully to click a button to acknowledge that he has read the code of conduct. The acknowledgment may then be sent back to the social networking system 101 where it is passed back to the activated node (and on to the node's handler).

A node's request for information and the target user's response need not be a real-time transaction. In other words, a node handler may request information from a user, but a user may not see the request until the next time they log into the social networking system 101. The user may provide the requested information hours, days, or even weeks later. When a node is said to be activated it may mean that the node handler is actively processing, or it may mean that the node handler is dormant as it waits for some data input. The data input that the node handler is waiting for may be user input, third-party data, or even data generated by a service running in the social networking system 101 or on an external service. Although the node is considered "active" during this time, when the node handler is dormant, the node need not consume computing resources and its state may be archived so that it can be reactivated to continue processing when the requested information becomes available.

The node handler is also responsible for determining which of the node's child nodes is activated next (or if the node graph processing should terminate). This determination may be scripted by engineers or it may be determined based on the output of machine-learned models trained by the machine-learning module 111. The process of determining the child-node to activate is described in more detail herein.

Once they are generated, node graphs are stored in the node graph store 200. A node graph may be attached as a child graph to another node graph. In this way a node graph that is useful in one context may be reused again within a larger process implemented by another node graph. Thus node graphs that are authored once can be reused for different customer incident report types. For example, a node graph that is designed to validate a user's identity may be beneficially embedded in a node graph that deals with credit card fraud reports, as well as in another node graph that deals with imposter account reports.

Graph Layout Manager

The graph layout manager 220 provides an interface to administrative users of the social networking system 101 so they can generate new node graphs to handle novel customer incident report types. Administrative users generate new node graphs in several ways. First, the administrative users can select from pre-existing components such as pre-generated nodes from the node store 225, and pre-generated node graphs from the node graph store 200, and can connect these to generate new node graphs with little or no additional engineering work. The graph layout manager 220 gives users a graphical or scripting interface to select and link existing components to create new node graphs that can handle novel customer incident report types. The new node graphs can be stored back in the node graph store 200, and they can then be used as components in other node graphs.

Second, the graph layout manager 220 allows administrative users to generate new nodes using existing UI widgets and node handlers from the widget store 210 and handler store 215. These new nodes can be used along with pre-existing nodes or node graphs to generate new node graphs. Nodes, once generated, can be stored in the node store 225 and can be reused.

The third way an administrative user can generate new node graphs is by generating new UI widgets and new node handlers, combining these together to form new nodes, and using the new nodes with existing nodes, node handlers, UI widgets, and node graphs. Generating new UI widgets and new node handlers may require significant engineering resources since these must be generated from scratch. For example, writing a new node handler requires an engineer to script the new functionality desired. However, the advantage of the node graph system is that the UI widgets and node handlers once generated are stored in the widget store 210 and the handler store 215, and are thus accessible to other administrative users, and so can be used in other nodes and node graphs to resolve other customer incident report types.

Node Graph Processing

Figure 3:
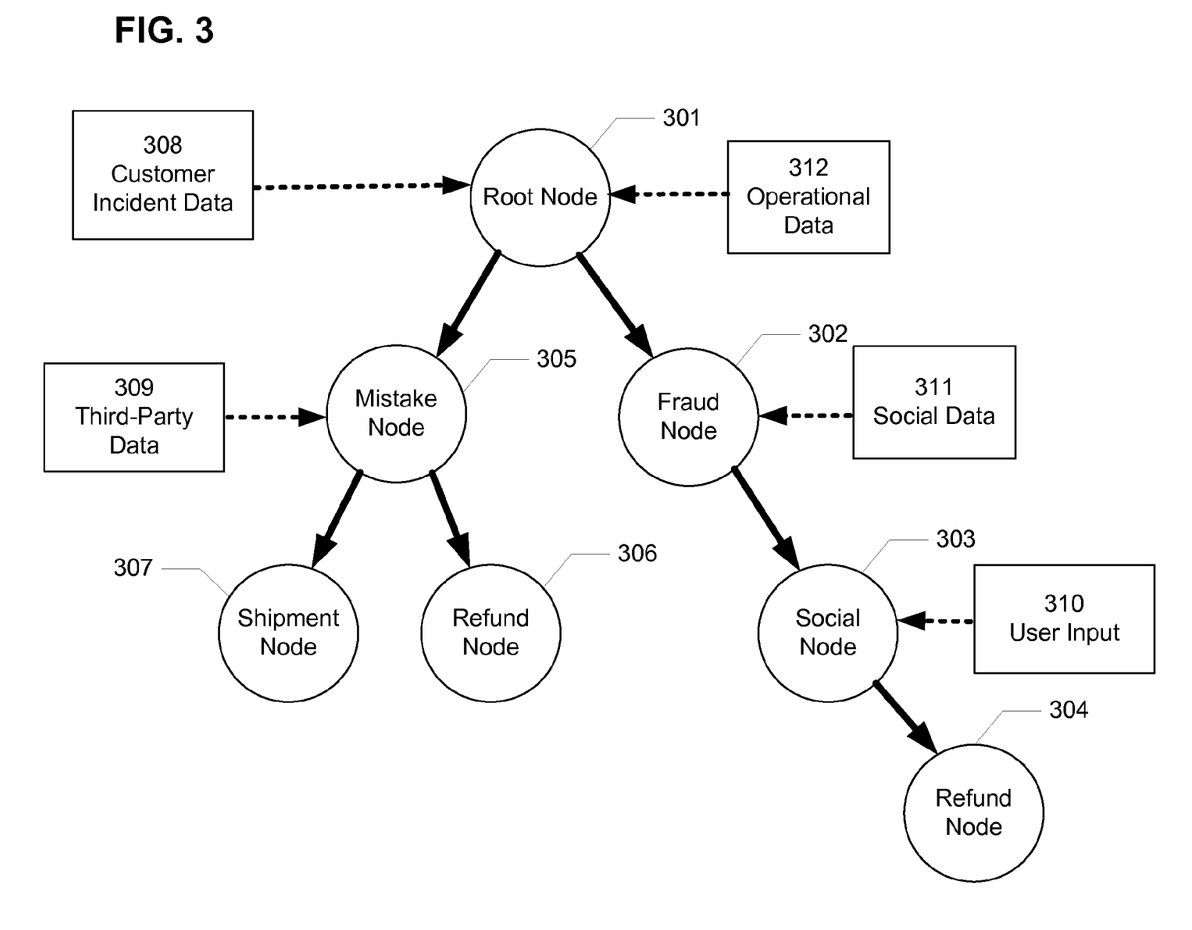
FIG. 3 illustrates one example of a node graph configured to resolve charge disputes in the social networking system.

FIG. 3 illustrates in greater detail a node graph configured to resolve customer incident reports related to charge disputes. In this example node graph there are seven nodes, labeled 301 to 307, but in practice a node graph generated to handle charge disputes might have many more nodes. Assume for the sake of this example that the illustrated nodes are just a subset of the actual nodes that would be present in such a node graph. Here the nodes consist of a root node 301, a fraud node 302, a social node 303, a refund node 304, a mistake node 305, another instance of a refund node 306, and a shipment node 307. The relationship between these nodes (the layout and connections) may have been arranged graphically or by script through the graph layout manager 220. Although not depicted in this illustration, each node in the graph has an associated handler, e.g. the root node 301 has a root handler, the fraud node 302 has a fraud handler, etc. The nodes in this node graph may have been created from scratch, or they may have been selected from pre-existing nodes. The refund nodes 304 and 306 are instances of the same node used in two different locations in the node graph. The refund node is an example of a node created once and used in two different contexts.

When a customer incident report is received by the social networking system 101 it may determine that this node graph should be activated to resolve the report. The decision to activate this node graph may itself be generated by another node graph that is configured to determine customer incident report types and to activate the appropriate node graph. If the received customer incident report concerns a charge dispute then the illustrated node graph may be activated to resolve it.

When the node graph is activated by the social networking system 101, data called the customer incident data 308 is made available to the root node (top node). The customer incident data is data derived from the customer incident report and includes information that is dependent on the customer incident report type. For example, if the customer report concerns a charge dispute, as in this case, the customer incident data may include information such as the social networking system user that was charged (the target user in this case), the merchant who levied the charge, the charge amount, the item or service that was purchased, the URL of the merchant's website, the date of purchase, the location of the purchase, etc. Operational data 312 may also be made available to the root node. This may include data such as information about similar charge disputes brought by other users against the same merchant, other charge disputes brought by the target user, other purchases made by the user from the same merchant, etc.

Based on the information made available to it, the root handler will determine the next node to activate in the node graph. In this case the root handler must activate either its child-node the mistake node 305 or its child-node the fraud node 302. The mistake node 305 handles the situation where the charge dispute appears to be the result of a mistake on the part of the merchant or the user. The fraud node 302 handles the situation where the charge dispute appears to be the result of fraud on the part of the merchant or some other party.

In this case, the child-node to activate may be determined using a fraud-detection model from the machine-learning module 111. The fraud-detection machine-learned model may be trained to detect fraud based on inputs provided to it by the root handler. For example, the root handler may provide information that indicates that the user has made several purchases from the merchant in the past, and that the disputed charge is the only disputed item amongst many other undisputed transactions. In this case the fraud-detection model may determine that the disputed charge is probably a result of a mistake (rather than fraud) and may pass control to the mistake node 305 by activating it.

When activated, the mistake node 305 will execute the mistake handler. The mistake handler may receive some input from the root handler (e.g. a determination that the charge is not fraudulent), and may request other data in order to make further determinations. For example, the mistake handler may request additional third-party data 309, for example, specific information about the disputed charge may be requested from a server operated by the merchant. This information may include, for example, details regarding the address where the ordered item was shipped and information regarding other items ordered at the same time as the disputed charge. Using this information the mistake node 305 determines whether the customer incident report is related to a shipment to a wrong address, or if it is a duplicate order that warrants a refund.

If the address where the item was shipped appears to be different than the user address information that the mistake handler has obtained—this information could have been passed to it from the root node 301 or it can be requested from the social data 120 stored by the social networking system—then the mistake handler may activate the shipment node 307. If the mistake handler determines that two identical products were ordered back-to-back by the target user, then it may determine that a refund is warranted and may activate the refund node 306.

The shipment node 307 will handle the interactions with the merchant and the target user that are required to correctly re-ship the product to the user. This may include displaying an apology (with the help of a UI widget) to the user for the delay in receiving their order and reassuring them that their item is on the way, and providing the merchant with a corrected shipping address after confirming the shipping address with the user.

The refund node 306 on the other hand will handle the interactions necessary to have the product returned by the target user and to process a refund. This may include contacting the merchant to inform them of the error in the order as well as informing the target user that the refund is being processed. The refund handler may also gather all the information related to the disputed charge into a structured form and place it in a queue for review by either a social networking system representative, or a representative of the merchant.

If the fraud-detection model used by the root handler determines that the disputed charge is most likely a result of fraud, instead of activating the mistake node 305, the root handler activates the fraud node 302. On execution the fraud handler may try to gather more information related to the disputed charge in order to determine the source of the fraud. For example, the fraud handler may determine based on social data 311 that the address that the merchant shipped the product to, is the address of the target user's residence. In addition, the merchant may provide data indicating that the product is most often purchased by teenage girls. Further, the fraud handler may determine from the social data 311 that the target user has a teenage daughter and may also learn from the social data that the teenage daughter recently posted a review of the product to the social networking system 101. This is an example of what credit card companies call "friendly fraud". Friendly fraud is the term used by credit card companies to describe disputed charges that are made by a member of the user's own family, without the user's knowledge. The social networking system is in a unique position to help resolve friendly fraud since it has information on not only the user, but also potentially the user's family members. Based on the identification of a possible occurrence of friendly fraud, the fraud node may pass control to the social node 303 by activating it.

The information available to the social node's handler (the social handler) may be insufficient for that handler to determine whether a refund is warranted or even desired by the target user. In this case the social handler may solicit additional feedback from the target user using a UI widget. The UI widget may generate a UI on the user device 100 that informs the target user that her daughter may have made the purchase, and may provide a link to the product review written by the daughter. In addition, the UI may communicate that the shipping information indicates that the product was shipped to the target user's address. Finally the UI may provide the target user with a button that allows the user to either return the item and obtain a refund, or cancel the charge dispute. If the target user selects the refund option, the social handler will activate the refund node 304, which can handle the refund process. If the target user opts to cancel the charge dispute then the social handler will simply mark the customer incident report as resolved and terminate the process. In this way friendly fraud can be resolved in a manner that satisfies both the user and the involved business. Such friendly fraud resolution is not possible for a credit card company operating with user information alone.

System Optimizations

The node graph system for handling customer incident reports lends itself to many beneficial optimizations. One method of optimizing the node graph system is to analyze the number of customer incident reports that are resolved by each branch and node in a node graph, and to measure the success rate and efficiency of these branches and nodes in terms of user satisfaction and resources used. This information can then be used to tweak the node graphs to improve underperforming branches and nodes. For example, if it turns out that in the node graph illustrated in FIG. 3 that the refund nodes 304 and 306 require an inordinate amount of involvement from human agents in order to process refunds, then it may be worthwhile to devote engineering resources to refine the refund handler so that more of the process is automated, such that less human resources are required for future refund processing.

The effect of node graphs on user satisfaction is more difficult to measure since direct user satisfaction surveys may themselves degrade user experience. To avoid this, machine-learned models from the machine-learning module 111 can be trained to generate a customer satisfaction score for a target user based on factors like their time spent on the social networking system, purchases made, content posted to the social networking system etc. The success of various nodes and branches of a node graph can then be measured by generating a customer satisfaction score for target users that were dealt with by those nodes and branches. If the satisfaction score for a particular node or branch of a node graph is poor, then the node or nodes can receive engineering attention to identify the reasons they are failing to satisfy users.

Using the satisfaction score and other metrics the system can also optimize node graphs and branches of node graphs using a champion-challenger model. In this model two node graphs (or branches) that are configured to resolve a particular type of incident can be measured against each other by assigning a random population of customer incident reports of the given type to each, and then measuring which one gives a better result for users on average (using satisfaction score or some other metric to measure the outcome). The superior node graph or node graph branch can then be assigned the majority (or all) of the customer incident reports of the given type. In this way, when a new method of resolving a customer incident report type is designed, it can be tested against existing methods of resolving the same report type.

Another avenue of optimization that is made available by the node graph system is real-time monitoring and traffic control for customer incident report management. Each node in each node graph of the customer incident manager 104 can be monitored to determine how often it is being activated. The node graphs can thus be monitored to determine if there are spikes in certain types of customer incident reports. Based on this monitoring, the social networking system 101 can take corrective measures to ameliorate or prevent spikes in some types of customer incident reports. For example, if there is a certain large spike in spam reports related to a particular link posted to the social networking system 101, the node graph related to handling spam reports may report this to the customer incident manager 104. Based on this information, the customer incident manager 104 can temporarily or permanently prevent the link from being posted to the social networking system 101.

Additional Concerns

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, from an administrative user a node graph, the node graph comprising a plurality of nodes and connectivity information indicating connections between the plurality of nodes, each node comprising a handler;
   receiving, from a user device, a customer incident report comprising customer incident data;
   responsive to receiving the customer incident report, activating the node graph, where activating the node graph comprises activating a first node in the node graph by performing the steps:
   executing the handler of the first node; and
   based on the execution of the handler of the first node, activating a next node in the node graph and providing output data from the first node to the next node; and
   generating a customer incident resolution using the activated node graph;
   wherein at least one node in the node graph further comprises a user interface widget, the user interface widget comprising a user interface definition;
   wherein activation of the first node further comprises: sending, to the user device, a user interface configuration, wherein the user interface configuration comprises information that is used by the user device to display a user interface, and wherein the user interface configuration is based on information from a user interface widget in the first node; receiving user input data from the user device; and providing the received user input data as input to the first node.

2. The method of claim 1, wherein activating a first node in the node graph comprises providing the customer incident data as input to the first node.

3. The method of claim 1, wherein activating a first node in the node graph comprises providing operational data as input to the first node.

4. The method of claim 3, wherein the operational data includes transactional data related to a purchase made by a user of a social networking system, wherein the transactional data is provided by a third-party system.

5. The method of claim 1, wherein the user interface configuration comprises HTML and JAVASCRIPT.

6. The method of claim 1, wherein the user interface configuration comprises FLASH.

7. The method of claim 1, wherein the handler of the first node comprises a PYTHON script.

8. The method of claim 1, wherein the handler of the first node comprises a PHP script.

9. The method of claim 1, wherein the handler of the first node comprises a JAVA program.

10. The method of claim 1, wherein the operational data includes social data related to a user of a social networking system.

11. The method of claim 1, wherein generating a customer incident resolution comprises executing a node handler to send a communication to the user device.

12. The method of claim 1, wherein generating a customer incident resolution comprises executing a node handler to generate an alert for the administrative user.

13. A method comprising:
   establishing a widget store, the widget store comprising one or more user interface widgets, each user interface widget comprising a user interface definition;

establishing a handler store, the handler store comprising one or more node handlers, each node handler comprising computer executable instructions;

establishing a node store, the node store comprising one or more nodes, each node comprising a node handler, and at least one of the nodes further comprising a user interface widget;

providing node graph generation means to an administrative user, the node graph generation means enabling the administrative user to generate a node graph using a subset of the user interface widgets, node handlers, and nodes, the node graph configured to generate a customer incident resolution when activated, based on an execution of a subset of the node handlers;

receiving, from a user device, a customer incident report comprising customer incident data;

responsive to receiving the customer incident report, activating the node graph; and generating a customer incident resolution using the activated node graph.

14. The method of claim 13, wherein generating a customer incident resolution further comprises executing a node handler to send a communication to the user device.

15. The method of claim 13, wherein generating a customer incident resolution further comprises executing a node handler to generate an alert for the administrative user.

* * * * *